H. M. Stow.
Well-Drill.
No. 75708 — Patented Mar. 17, 1868
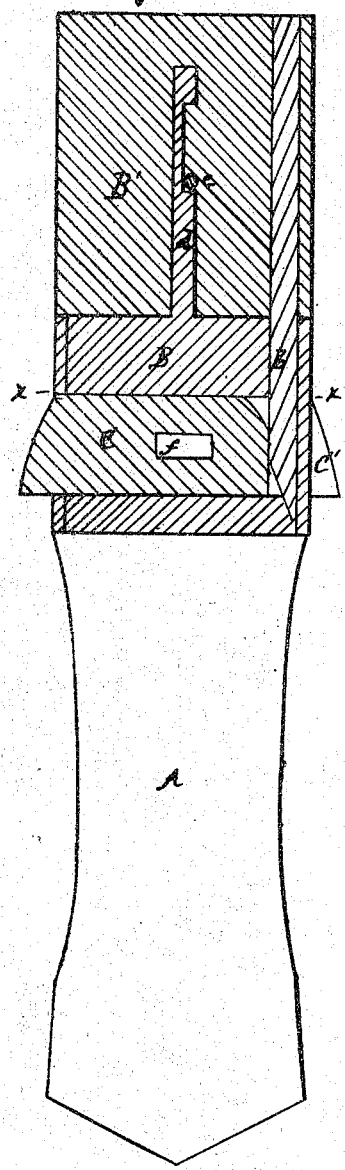
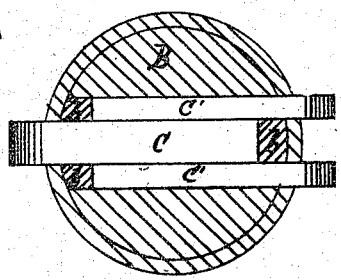
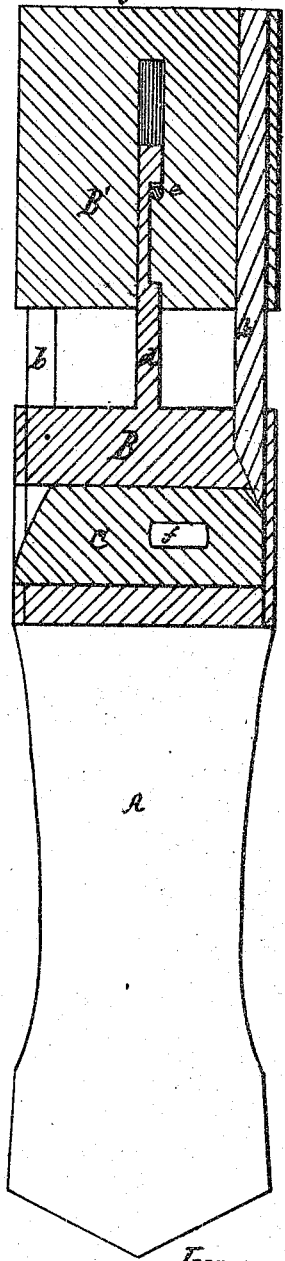
Witnesses
Jos. L. Coombs
Thos. M. Coombs
Inventor
Henry M. Stow
By J. L. Coombs
Attorney

United States Patent Office.

HENRY M. STOW, OF SAN FRANCISCO, CALIFORNIA.

Letters Patent No. 75,708, dated March 17, 1868.

IMPROVED WELL-DRILL.

The Schedule referred to in these Letters Patent and making part of the same.

TO ALL WHOM IT MAY CONCERN:

Be it known that I, HENRY M. STOW, of San Francisco, in the county of San Francisco, and State of California, have invented a new and useful Improvement in Drills for Boring Artesian Wells; and I do hereby declare that the following is a full, clear, and exact description thereof, reference being had to the accompanying drawings, and to the letters of reference marked thereon, in which—

Figure 1 is a vertical section of the drill and drill-stock, the two parts B and B' of the drill-stock being closed together, and the movable cutters thrown out.

Figure 2 is a similar section, the said two parts of the drill-stock being drawn asunder, and the movable cutters pushed in; and Figure 3 is a cross-section in line $x\ x$, fig. 1.

The object of this invention is to provide a drill that will form a hole large enough to admit of putting down a pipe of uniform diameter as the well is bored, through which the drill may be withdrawn and re-inserted without removing the pipe.

It often happens in boring artesian wells that some of the strata penetrated are so loose and friable that the well will cave in during the process of drilling, unless the walls are protected by a curb-pipe; but in boring with the ordinary drill, if a pipe is inserted above the drill, the latter cannot be withdrawn and re-inserted without removing the pipe. I obviate this difficulty by means of movable cutters, located in the drill-stock, above the drill proper, which will slip inwardly so as to pass through a hole smaller than that actually bored when the drill is withdrawn from the well, but which, when the drill is again inserted, will strike out radially on the first fall of the drill, and so remain while the drill is working, that they will form a hole somewhat larger than is necessary to draw the drill and movable cutters through.

In the accompanying drawings, A is an ordinary drill, and B is the lower part of the drill-stock, into which the drill A is inserted. This part of the stock is cylindrical in form, and about the size of the hole which the drill A will bore. B' is the upper portion of the drill-stock, also cylindrical in form, and nearly as large as the part B, and is connected thereto by means of sliding tenons $b\ b$, fitting into corresponding vertical mortises in B. C and C' are movable cutters for enlarging the hole formed by the drill A, and $d$ is a central guide-rod, firmly attached at its lower end to B, but sliding in a central hole in B'.

It will be seen that the lower ends of the tenons $b\ b$ are made in wedge-form by bevelling their inner sides. The cutters C and C' move freely in and out radially in mortises in the part, B, of the cylindrical stock. It will be seen also that when the part, B', is pressed down so as to be in close contact with the part B, as shown in fig. 1, the wedge-shaped lower ends of the tenons $b\ b$, acting upon the rear ends of the cutters C and C', will throw them out, as shown in fig. 1, but when B and B' are drawn asunder, as shown in fig. 2, the said cutters, being bevelled on their upper corners, will freely slip inward on coming in contact with the pipe or any other obstruction in their ascent.

The parts B and B' should adhere together with such tenacity that they will never separate except when the movable cutters encounter some obstruction in their ascent, so that in working the drill, the said two parts will rise and fall together, and only separate when the whole apparatus is withdrawn from the well. A sufficient degree of tenacity for this purpose may be obtained by mere friction of the moving parts connecting B and B'. A slot or recess in the centre rod $d$, embracing a stop-screw, $e$, prevents the parts B and B' from becoming detached, or from separating further than shown in fig. 2. The said stop-screw $e$ may press against the rod $d$ so as to create the necessary friction to prevent the parts B and B' from separating in the ordinary working of the drill. When the drill is inserted in the well, (after having been withdrawn therefrom,) the parts B and B' are separated, as shown in fig. 2, and the movable cutters pushed in, so that they will pass freely down through the curb-pipe; but when the drill A strikes the bottom, the superincumbent weight of the drill-rods and sinker will cause the said parts B and B' to close together, the wedge-shaped tenons throwing out the movable cutters, as shown in fig. 1.

The movable cutters may have a bolt running transversely through B, and through slots $f$ in the cutters, but this is not absolutely essential, as they will necessarily remain in place when in the well. There may be two, three, or four movable cutters, and a corresponding number of wedge-shaped tenons, but it will be most convenient to have three cutters, two on one side and one on the other, working between them.

What I claim as my invention, and desire to secure by Letters Patent, is—

In combination with a drill-stock in two parts, as described, movable cutters, operated by wedge-shaped tenons to enlarge the hole formed by the drill, substantially as shown and described.

HENRY M. STOW.

Witnesses:
J. J. COOMBS,
JOS. L. COOMBS.